United States Patent [19]

Deutsch et al.

[11] Patent Number: 5,187,594
[45] Date of Patent: Feb. 16, 1993

[54] METHOD OF CREATING AND APPLYING HALF TONE SCREEN PATTERNS

[75] Inventors: Keith R. Deutsch, Amherst; Per H. Bjorge, Hollis; Alan Blannin, Amherst, all of N.H.

[73] Assignee: Graphic Edge, Inc., Amherst, N.H.

[21] Appl. No.: 477,799

[22] Filed: Feb. 9, 1990

[51] Int. Cl.$^5$ .............................................. H04N 1/40
[52] U.S. Cl. .................................... 358/455; 358/459; 358/465
[58] Field of Search ............... 358/428, 429, 430, 448, 358/452, 455, 456, 458, 459, 460, 465, 466

[56] References Cited

U.S. PATENT DOCUMENTS

| 4,075,663 | 2/1978 | Wellendorf | 358/298 |
|---|---|---|---|
| 4,231,069 | 10/1980 | Wellendorf et al. | 358/450 |
| 4,236,174 | 11/1980 | Gall | 358/22 |
| 4,393,399 | 7/1983 | Gast et al. | 358/80 |
| 4,413,286 | 11/1983 | Boston | 358/298 |
| 4,419,690 | 12/1983 | Hammes | 358/75 |
| 4,486,788 | 12/1984 | Yamada | 358/457 |
| 4,499,489 | 2/1985 | Gall et al. | 358/75 |
| 4,506,301 | 3/1985 | Kingsley et al. | 358/451 |
| 4,516,155 | 5/1985 | Hennig et al. | 358/80 |
| 4,554,594 | 11/1985 | Ciardiello et al. | 358/456 |
| 4,618,523 | 10/1986 | Yoshida | 428/189 |
| 4,635,131 | 1/1987 | Terada et al. | 358/296 |
| 4,661,859 | 4/1987 | Mailloux et al. | 358/298 |
| 4,686,579 | 8/1987 | Sakamoto | 358/457 |
| 4,701,401 | 10/1987 | Leenders et al. | 430/257 |
| 4,706,206 | 11/1987 | Benoit et al. | 364/526 |
| 4,710,444 | 12/1987 | Leenders et al. | 430/237 |
| 4,730,221 | 3/1988 | Roetling | 358/298 |
| 4,758,886 | 7/1988 | Rylander | 358/80 |
| 4,933,775 | 6/1990 | Shimura | 358/456 |

Primary Examiner—Edward L. Coles, Sr.
Assistant Examiner—Jerome Grant
Attorney, Agent, or Firm—Cesari and McKenna

[57] ABSTRACT

A technique for creating and applying half tone screen patterns by computer, consisting of a screen generator and a screen applicator. The screen generator accepts a set of parameters specifying the angle and frequency of the desired screen, the output printing device resolution, and parameter tolerances. It then produces a half tone screen pattern file according to the specified parameters, as a set of repeat arrays for each desired gray level. The screen applicator accepts an input contone image representation such as is produced by a scanner or other device, and the half tone screen pattern file produced by the screen generator. It then interpolates between the pixel values, at the output device resolution, by examining the repeat arrays for each device cell. In this way, a representation of a half tone screening of the input contone image results where the output device resolution is fully exploited.

27 Claims, 10 Drawing Sheets

METHOD OF CREATING AND APPLYING HALF TONE SCREEN PATTERNS

FIELD OF THE INVENTION

This invention relates generally to computer-based image reproduction, and particularly to a technique for creating and applying half tone screen patterns.

BACKGROUND OF THE INVENTION

Various apparatus for quality reproduction of images on plain paper, such as the printing press and electrostatic copier, have been known for hundreds of years. Such apparatus typically operate by exposing selected areas of the paper to ink or toner and preventing exposure of other areas. They work quite well for sharp, high contrast images such as text and line art graphics.

Quality reproduction of images consisting of continuous tones, such as photographs, requires an additional so-called half tone screening step. Half tone screening involves photographing the image through a screen to break it into a grid of small screened dots of varying size. The screen is comprised of many identical elemental apertures, or screen cells—the area of a screen cell thus determines the size of resulting screened dots. The result is that although the screened dots themselves are of solid, uniform color, the variation in size is averaged by the eye to give an appearance of gray tones.

Screening is also used when printing color images to enable separate printing of the primary color components. A separate half tone plate is first made for each of the primary colors. The primary color components are then printed over one another by means of the plates, which serve to selectively control where inks of different colors are applied to the paper. A common problem in color image reproduction is avoiding Moiré patterns, which result from interference between the periodic dot patterns printed by the respective screens. Moiré patterns may be eliminated by careful control of the relative angular orientation for screens of different colors. Moiré patterns may also be avoided by using different screen frequencies (or pitches) for each of the primary colors. The ability to use various screen angles and screen pitches can also be used to improve the quality of monochrome images.

With proliferation in the use of computers in the publishing industry in the last two decades, processes for electronic generation of half tone screened images are also widely used. Generally speaking, such techniques proceed by first electro-optically scanning the image line-by-line and digitizing the resulting electrical signals, to produce a computer-readable representation of the source image. The source image representation consists of a matrix, or array, of digital data values, called pixel values, which correspond to the light intensity of a particular elemental area, or pixel, of the source image. The memory location in which a pixel value is located corresponds to the spatial position of its corresponding pixel in the source image. In the case of a monochrome source image, the source image pixel values may assume a number of different gray values or levels.

Although in an electronic screening system as described herein, no light actually passes from the source image through a screen, an analogy can be made to physical systems whereby the relative size of the screened dot corresponds to the intensity of the light from the source image.

Thus, a mathematical representation for the screen is also developed. This has previously been accomplished by using a second array of optical density values which specify the light transmissive properties of a single physical screen cell. The source image pixel values are then compared to the screen of cell array to generate an indication of how large each screened dot of the printed image should be made.

However, to reproduce the effect of various screen angles and pitches, this comparison process must also include a number of trigonometric calculations to translate and rotate the screen cell array representation with respect to the image. Unfortunately these calculations are fairly computeintensive. As such, prior approaches typically require special hardware to generate the transformations with the required accuracy resolution, at the time the image is rendered on an output device.

What is needed is a way to electronically produce screened half tone images in real time while avoiding the need for specialized hardware to perform these trigonometric calculations.

Another problem typically occurs because of the nature of most present day output devices. Film recorders, raster-scan displays and laser printers are device-dot addressable; that is, each elemental displayable or printable unit, or device dot must be specified.

In the case of a monochrome display, the device dot is rendered by turning it either on or off, and in the case of a laser printer, the device dot is rendered by either coloring the paper black or leaving it white. Thus, in some prior art devices, the comparison of source image pixel values and density values can be partially completed beforehand. That is, given a particular screen cell size, it is possible to determine a screen cell array for a particular source image pixel value, where the elements of the screen cell array specify how a number of adjacent device dots are to be rendered in order to produce a screened dot of the correct size. A screen cell array can thus be precalculated for each of the possible values which a source image pixel may assume: at the time of rendering the source image, the correct screen cell array is then simply used, as specified by the source image pixel value.

However, a given screen cell array must still be translated and rotated, and thus the axes of the device dots will not be necessarily aligned any longer. Thus, the screen cell array often not perfectly aligned with the grid of device dots, any resulting fractional bias of the device dots is often readily visible to the eye in the resulting half tone image and thus additional calculations are necessary to compensate for this.

Furthermore, consider also that as the gray levels across an area of the source image change, the resulting change in screened dot shape should occur in a controlled fashion. For example, in some instances, elliptically shaped dots are preferred to ensure that the dots merge uniformly as the gray level increases above a mid tone value.

A number of difficulties thus exist with electronic production and application of half tone screens when using present day device dot addressable output devices.

SUMMARY OF THE INVENTION

The present invention consists of a screen generator and a screen applicator. The screen generator accepts a set of parameters specifying the angle and pitch of the desired screen, the pitch of the device dots and parameter tolerances. It then generates a half tone screen pattern file according to the specified parameters. A complete screen pattern file includes a repeat array for each possible gray level in a source image. Each repeat array pattern contains a regular, repeatable description of how two or more screen cells are to be rendered on the output device for a given gray level.

The screen applicator accepts both a contone source image representation such as that produced by a scanner or other device, and also accepts the half tone screen patterns produced by the screen generator. The screen applicator interpolates between the source image pixel values in the source image, at the resolution of the output device, and then selects appropriate portions of one or more repeat arrays associated with the interpolated pixel values. In this way, a representation of a half tone screening of the source image results in which the output device resolution is fully exploited.

In one preferred embodiment of the invention, the screen generator forms the half tone screen pattern file by considering the structure of more than one screened dot at a time. This is accomplished by specifying several screen cells, with each screen cell specifying how a different screened dot is to be rendered. A group of simultaneously considered screen cells form a basic unit referred to as a repeat array. The screen cells with a repeat array consist of a matrix of device cells. Each device cell contains a data value specifying how a corresponding device dot is to be rendered for a given source image pixel value. The values for different screen cells within a given repeat array may vary, as well as the number of device cells corresponding to a given screen cell. To form a seamless half tone screen pattern large enough to cover the source image, the repeat array is then simply repeated, in a tile-like fashion.

Furthermore, in the preferred embodiment, the screen applicator treats the source image pixel values as an array of point samples. In order to render a screened representation of the contone image, the point samples are interpolated at the resolution of the output device to determine an interpolated gray level for each device cell. To render a particular device dot, the repeat array associated with the interpolated gray level is simply examined, to determine the device cell corresponding to the current spatial position, which in turn specifies how the current device dot is to be rendered.

There are several advantages to the invention.

Because all possible device cell patterns are precalculated, precise control over screen angle and frequency is available, thereby enabling elimination of Moire patterns. Likewise, the structure of each screened dot is explicitly controllable, and so fractional bias and malformed dot problems are minimized.

Furthermore, because the structure of more than one screen cell at a time is considered, and because the device cell patterns within the repeat array are precalculated for the precise screen angle and frequency, only a simple interpolation calculation and template look-up operation are necessary at the time of rendering the image. The required computations are thus greatly reduced. Interpolation also has the effect of producing a much higher quality image.

BRIEF DESCRIPTION OF THE DRAWINGS

The above and further advantages of the invention may be better understood be referring to the following description in conjunction with the accompanying drawings, in which.

DETAILED DESCRIPTION OF AN ILLUSTRATIVE EMBODIMENT

The following discussion includes a description of (1) the general architecture of a computer system used to synthesize and apply half tone screen patterns according to the invention; (2) how half tone screen patterns having properties and advantages described herein may be synthesized; (3) how half tone screen patterns may be compactly represented and (4) how these screen patterns may be applied to contone source image pixel values in an efficient and advantageous manner such that system performance is maximized and the resulting screened dots are shaped at the full resolution of the output device. The discussion is augmented by several illustrations showing how specific patterns are synthesized, represented, and applied in various ways.

(1) GENERAL SYSTEM ARCHITECTURE

Figure 1:
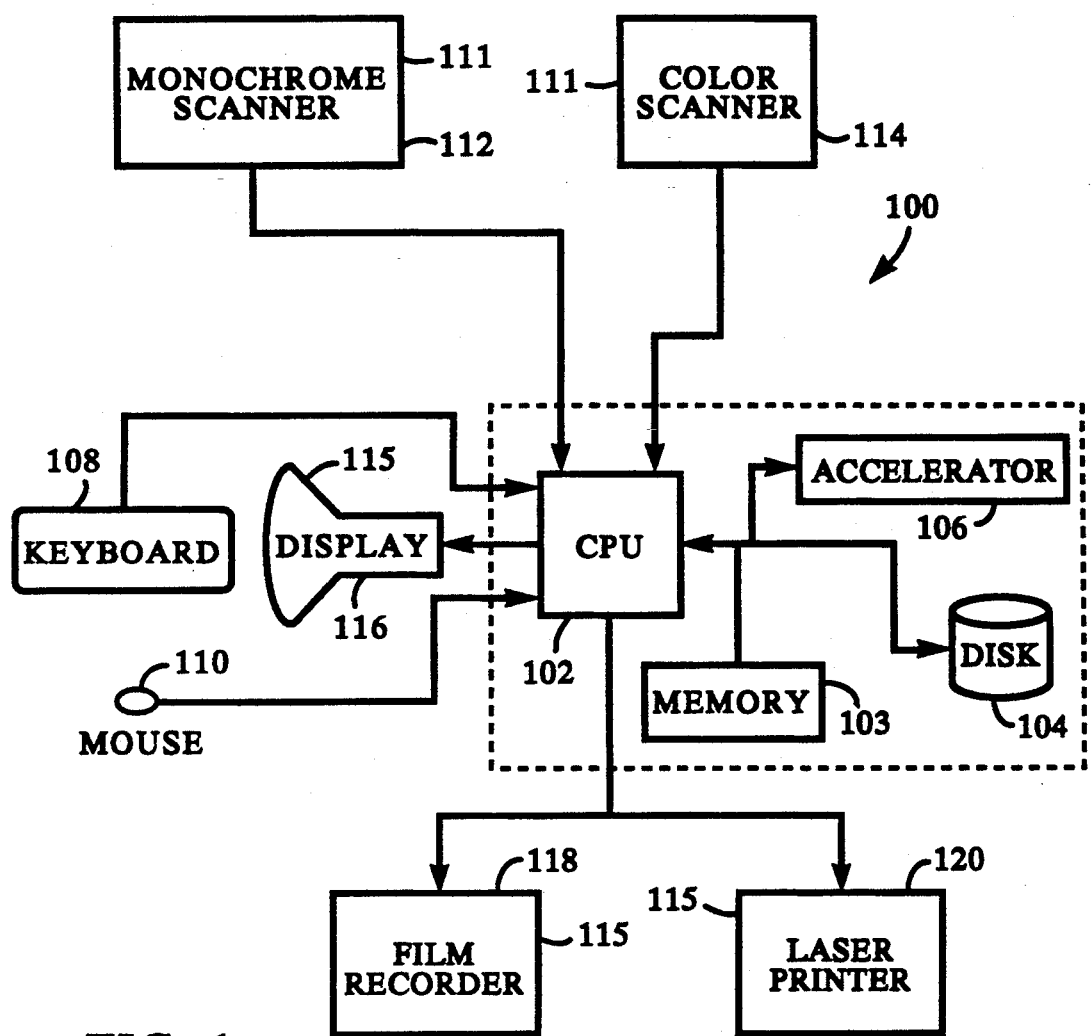
FIG. 1 is a hardware system block diagram of a computer-based half tone production system that generates and makes use of half tone patterns according to the invention.

FIG. 1 is a hardware block diagram of an exemplary computer imaging system 100 including a central processing unit (CPU) 102, a memory 103, and a mass storage device such as a disk drive 104. Given the stringent processing time requirements in many image processing applications, the system 100 may also use a processor accelerator 106. Peripheral equipment associated with the CPU 102 includes devices such as a keyboard 108, a mouse 110 and an image data input device 111 such as a monochrome scanner 112 or a color scanner 114. The peripheral equipment also includes output devices 115 such as a video display 116, a film recorder 118, or a laser printer 120. The imaging system 100, including the peripherals, are of conventional construction and known in the art. For example, the CPU 102 may be an International Business Machines (IBM) Personal Computer programmed to perform the several functions described below.

Figure 2:
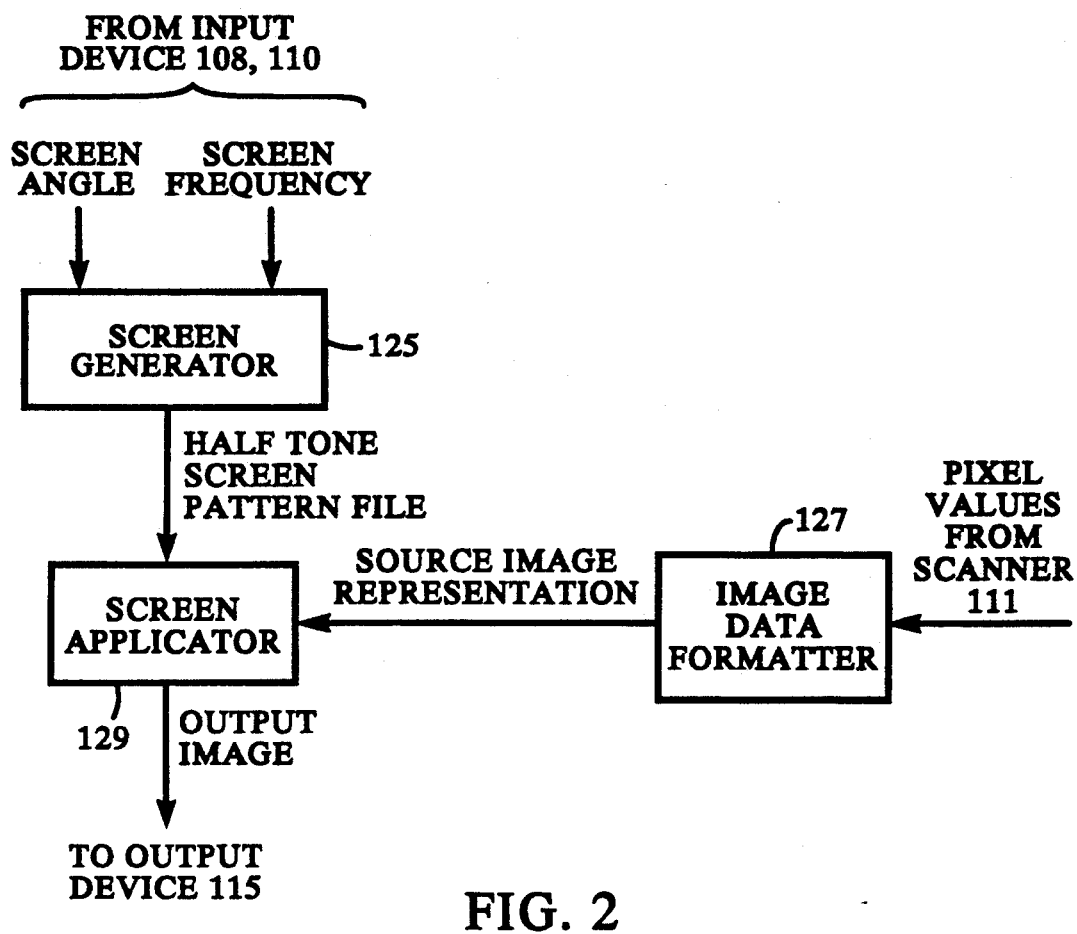
FIG. 2 is a software system block diagram of the half tone production system, showing a screen generator module and a screen applicator module according to the invention.

Referring now to the system software block diagram in FIG. 2 together with FIG. 1, in accordance with the invention, the CPU 102 operates on a set of supplied instructions, or software, stored either in the memory 103 or in the storage device 104, to perform certain functions such as reading image data from the input device 111, performing data processing, and writing image data to the output device 115. As described in detail below, a first set of instructions, referred to as a screen generator module 125, accepts parameters such as screen angle and pitch from a user via the keyboard 108 or mouse 110, or from an application program running on the CPU 102. It then produces a half tone screen pattern file having the characteristics specified by the supplied parameters. This data file is saved in the storage device 104 or the memory 103.

A source image, typically originating as a document or photograph, is fed into one of the image data input devices 111 to an image formatter module 127, which produces a representation of the source image as an array of source image pixel values. In the case of monochrome scanner 112, each pixel value typically indicates the tone, or gray level, of a particular elemental area, or pixel, of the image. Each pixel value is typically comprised of a P-bit binary value; in the preferred embodiment, the source image pixel values are eight-bits wide. Each pixel value thus specifies one of 256 possible gray levels.

In the case of color scanner 114, each source image pixel value typically indicates one or more colorimetric properties of the corresponding pixel, such as the intensities of one or more primary colors. The primary colors may include red, green, and blue (RGB) or cyan, yellow, magenta and key (black) (CYMK). Thus, in the implementation of the invention described herein, although source image pixel values are described as representing the gray levels of a monochrome image output by monochrome scanner 112 digitized to eight bits, it should also be understood that the invention is not limited to monochromatic images or particular pixel value formats.

The source image pixel values are organized into a two-dimensional array, or contone source image representation, by the CPU 102. Each pixel value in the image representation represents the gray level of a corresponding elemental area of the source image, with the array coordinates of a particular pixel value specifying its spatial position. The image representation is typically then stored in the storage device 104 or the memory 103.

To render the image, the CPU 102 uses a final set of instructions, namely a screen applicator module 129. The screen applicator module 129 interpolates the contone source image representation, in conjunction with the half tone screen pattern file, to render an output image in which the intensity information in the source image representation is transformed into appropriately sized and shaped screened dots which, by virtue of the interpolation technique described herein, are formed at the full resolution of the output device 115. This new representation of the source image, or image rendering, may be stored on the mass storage device 104, or sent directly to the appropriate output device 115 for printing o display.

2) HALF TONE SCREEN PATTERN FILE SYNTHESIS

Briefly, a complete half tone screen pattern file is composed of a repeat array for each of the possible gray levels in the source image. Since the number, Q, of possible gray levels in the source image is given by $$Q=2^P$$

then a complete half tone screen pattern file includes Q repeat arrays.

In systems known in the art, each repeat array typically includes a description of how to render a single, ideal screened dot. The ideal screen dot description is then applied by rotating it to the correct angle, translating it to the correct position with respect to the source image, and then remapping it to the output device axes.

However, in the case of the invention, each repeat array consists of a description of two or more adjacent screened dots for a particular gray level. Each screened dot is represented as a screen cell; thus, there are several screen cells in a single repeat array. Each screen cell contains an array of so-called device cells, which in turn specify how each of the device dots are rendered. Because the screen is a half tone, the screened dots are thus formed from arrays of black and white device cells.

Figure 3A:
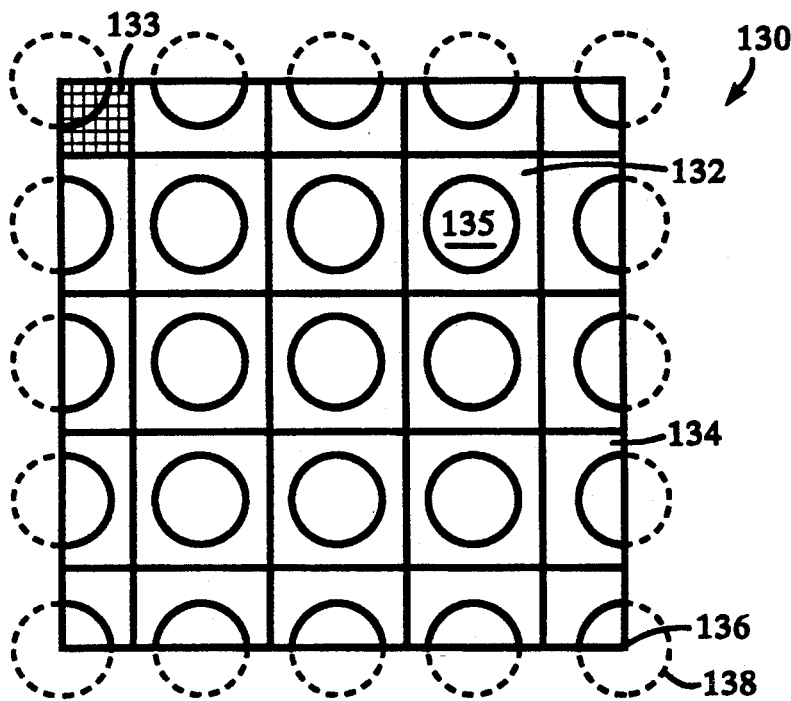
FIGS. 3A and 3B illustrate a repeat array and how it is repeated in a tile-like fashion.

Thus, in the case of the invention, each repeat array contains a specification for several screened dots which are already rotated to the desired angle and already spaced at the desired pitch. As shown in FIG. 3, an exemplary repeat array 130 is a rectangular array containing a number of complete half tone screen cells 132. Each screen cell 132 is comprised of a number of device cells 133, and specifies how a corresponding screened dot 135 is to be rendered at a particular gray level associated with the repeat cell 130. The repeat array 130 may have any regular, repeatable shape, but is preferably a square. A number of partial screen cells 134 may also be included in the repeat array 130. The repeat array 130 thus describes how the several adjacent screened dots 135 are rendered for a particular gray level.

Figure 3B:
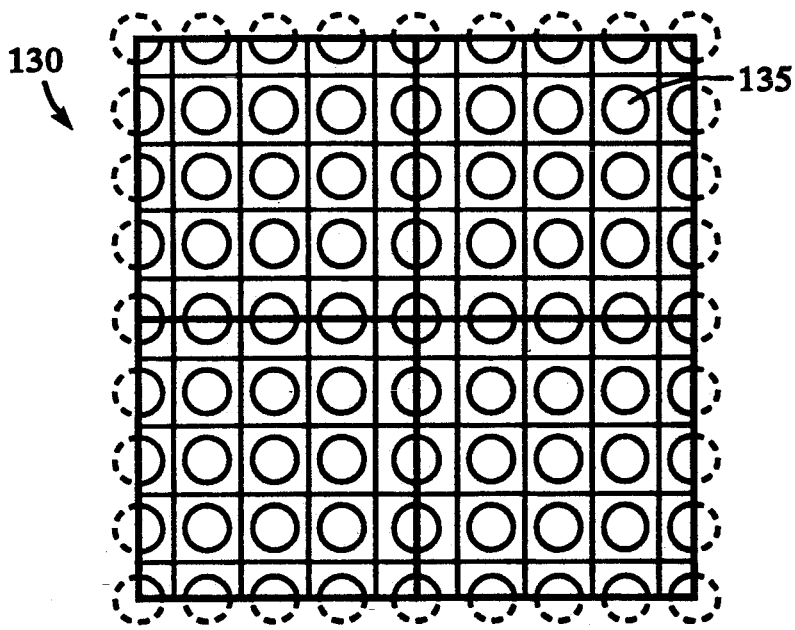

A repeat array 130 is formed so that when it is repeated in a tile-like manner, a seamless or continuous pattern will result, such as in FIG. 3B. To insure that adjacent repeat arrays 130 align properly, each of the four corner device cells 136 of a repeat array 130 are preferably located in the same position relative to the center of the nearest respective screened dot 138 in the pattern. In the example shown, each corner device cell 136 is located at the precise center of its corresponding screened dot 138. Although this is the simplest case, it is not a requirement, and the system may select other device cells as the corners of the repeat array 130.

Given input parameters such as a screen frequency, F, in dots per inch, and a screen angle, $\theta$, with respect to the coordinate system of the output device 115, it should be apparent to those of skill in the art that a repeat array 130 can be determined for any given screen. However, in order to better understand how a repeat array 130 can represent a screen of any possible screen angle and frequency, consider FIG. 4. As shown therein, the repeat array 130 is rotated through a known angle α with respect to the axes 141x and 141y of the output device 115. The angle α is always greater than 0° and less than 90°, and therefore an acute right triangle is formed by the sides of the repeat array 130 and its projections on the vertical and horizontal axes of the device coordinate system 135. The lengths of the perpendicular legs of the right triangle, in device cells 133, are given by the values of a and b, with a being the length of the horizontal projection, and b being the length of the vertical projection. Thus, a and b are related to the angle α as:

$$\alpha = \tan^{-1}(b/a)$$

The repeat array 130 can also be considered as rotated at another known angle, β, with respect to screened dot axes 145x and 145y. Another right triangle is thus formed by the sides of the repeat array 130 and its projections on the vertical and horizontal axes of the dot coordinate system 145. The lengths of the perpendicular legs of this right triangle, in dots, are given by the values of A and B, and thus β is given by:

$$\beta = \tan^{-1}(B/A).$$

Figure 4:
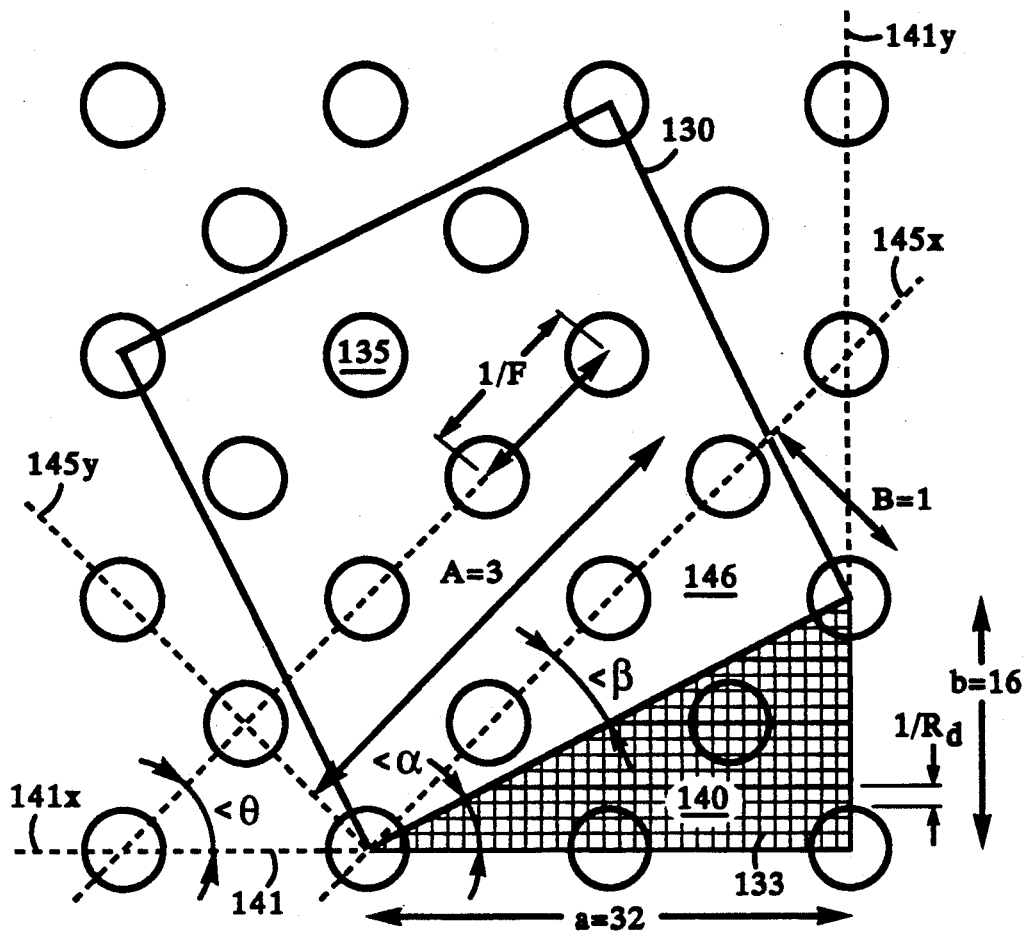
FIG. 4 is a diagram of how certain input parameters specify a repeat array.

It can be readily seen from FIG. 4 that α is always positive but β can be either positive or negative; in the example shown, we consider β to be negative.

Thus, from simple trigonometry and recalling that the repeat array 130 is preferably a square, the following relationships are always true:

$$\theta = \alpha - \beta;$$

and $$F = \sqrt{(A^2 + B^2)} * Rd/\sqrt{(a^2 + b^2)} ;$$

Where Rd is the pitch of the output device, so that any possible θ screen angle or F screen frequency can be obtained to any desired accuracy (within the resolution of the output device 115), by appropriately changing a, b, A, and B.

If a variable K is also defined such that the number of screened dots 135 in a square repeat array 130 is equal to K/2, then:

$$K/2 = A^2 + B^2;$$

and the number, S, of device cells 133 contained within repeat array 130 is given by:

$$S = a^2 + b^2$$

Thus, any possible screen angle or pitch can be supported, even when the secondary angle, β, is constrained to be zero. However, if it is desirable to achieve the specified tolerances with the smallest possible repeat array 130, the number of possible combinations of angle and frequency which can be represented by a repeat array 130 of a given size can be increased by allowing β to be specified. This point can also be understood by considering that when β and thus A and B can be varied, the number of screened dots 132 which can be also used as corner dots 136 in the repeat array 130 is increased substantially.

Once the general configuration of the repeat array 130 is determined so that a given set of angle and frequency specifications can be met, a repeat array 130 is constructed for each of the Q possible gray levels. In order to accomplish this, some subset of the S device cells 133 within the repeat array 130 are filled (e.g., changed from value specifying "off" or "white", to a value specifying "on" or "black", for a display or printer, respectively of the remainder of this discussion assumes that the output device is a printer.) in an ordered fashion from gray level to gray level. For example, the template for a first gray level typically consists of device cells 132 all having a white value. Repeat arrays 130 for successively darker, or higher, gray levels will have additional device cells 133 in each screened dot 132 filled by setting them to a black value.

It would thus appear at first glance that the generation of repeat arrays 130 for each of the Q gray levels is fairly straightforward. However, when determining the exact configuration for the repeat arrays 130 it is important to avoid several problems.

A first problem is that the screened dots 135 should be "well formed", in the sense that the output device 115 will make them as solid as possible, without thin tendril-like structures.

Figure 5:
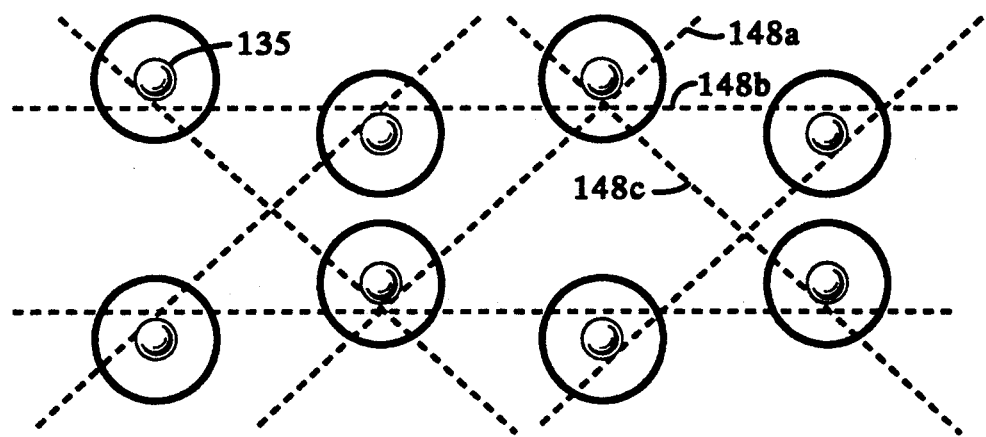
FIG. 5 is a diagram of the screen cell centerlines within a repeat array.

Another problem is a fractional bias of screened dots 135 along lines orthogonal to and perpendicular with the dot axes 145x, 145y or device axes 141x, 141y. Even though the bias will be on the order of the size of a device cell 133, this bias can be quite discernible to the eye when the image is viewed at a normal distance. This problem usually occurs if the specific screen angle θ is such that exact alignment of the centers of the screened dots 135 with the centers of adjacent screened dots 135 is impossible. Thus, as shown in FIG. 5, in the preferred embodiment, adjacent screened dots 135 in the repeat array 130 are preferably "balanced" about imaginary centerlines 140 drawn through horizontal, diagonal, and vertical lines of screened dots 135. The balancing is preferably accomplished by staggering the spacing between dot centers and the intersections of the imaginary centerlines 140, so that the eye averages the staggered position of the screened dots 135.

Figure 6:
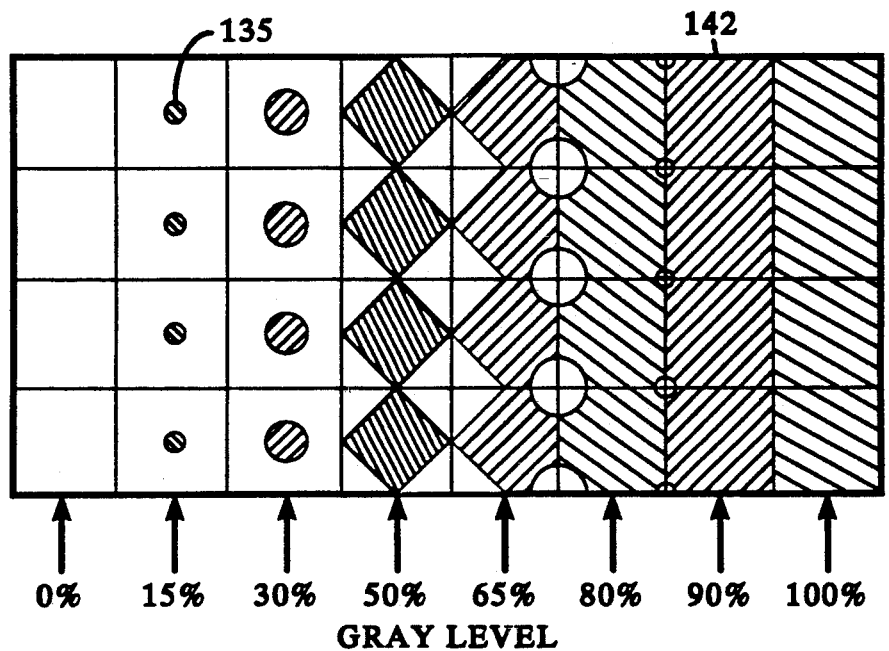
FIG. 6 illustrates the transition from dot-dominance to hole-dominance in a half tone pattern as gray level increases.

Yet another complication stems from the fact that, as shown in FIG. 6, a half tone pattern can be considered to consist not only of screened dots 135, but also screen holes 142, i.e., "white dots". In gray levels above the mid tone, the corners of the screened dots 135 merge, and inspection of the image reveals a pattern of holes 142. Since the holes 142 thus become the dominant structure at blacker gray levels, they, too must be balanced about centerlines and well-formed. However, since each hole 142 consists of the corner sections of four different screened dots 135, explicit control of the manner in which the holes 142 are formed is not necessarily easy to accomplish.

Figure 7:
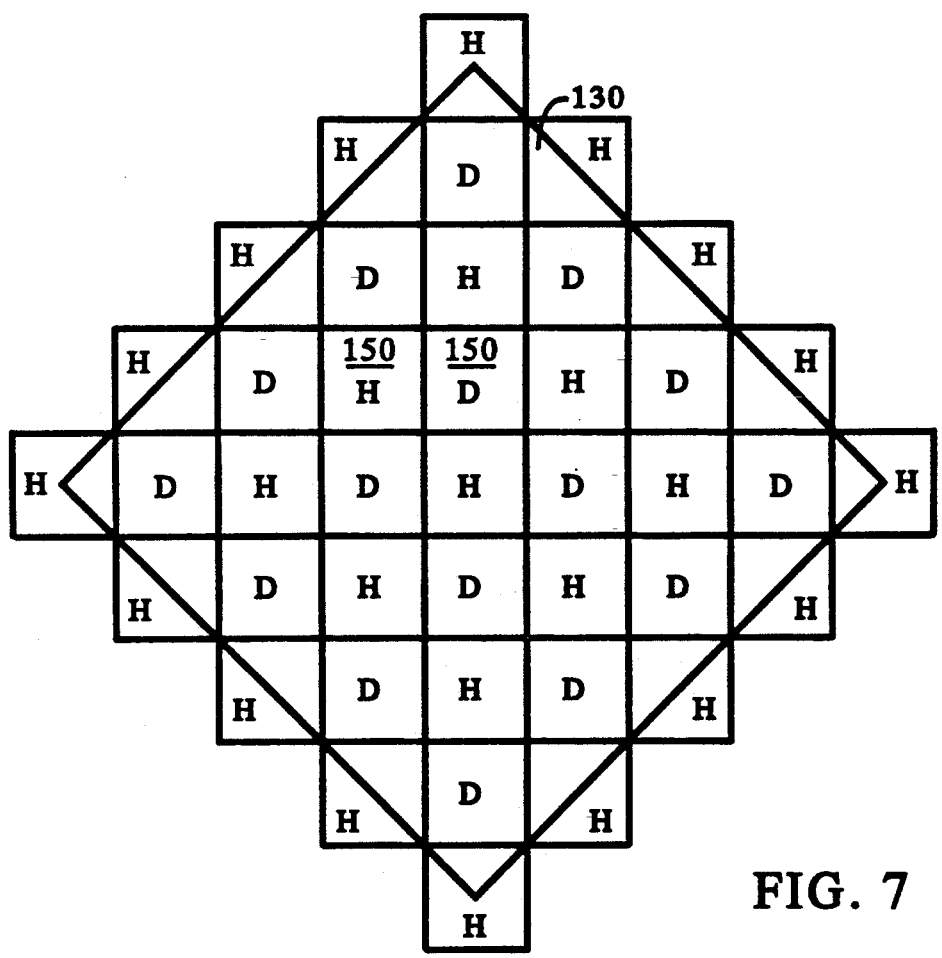
FIG. 7 illustrates a preferred relationship between the repeat array and a mapping array.

The problems of screened dot shape, screened dot bias, and hole formation are solved in the preferred embodiment because the screened dots 135 with a repeat cell 130 for a given gray level do not necessarily have all the same exact shape. Thus, to allow this additional degree of freedom, a second array of values, called a mapping array 148, is used. An exemplary mapping array 148, shown in FIG. 7, is a convenient way to specify the order in which the device cells 133 in a repeat array 130 are filled as the gray level increases. The function of the mapping array 148, as will be understood shortly, is thus to explicitly control the placement of device cells 133 and thus the shape of the screened dots 135 for a given gray level.

The mapping array 148 is configured into a number of elements 150, each of which independently describes either a screened dot 135 or a hole 142, as indicated by the letters "D" and "H", respectively. There is a dot element 150 associated with each screened dot 135 in the repeat array 130. The dot elements serve to specify the exact formation of the screened dots 135 as the gray level increases; the adjacent hole elements assist in controlling the formation of the holes 142.

The elements 150 are arranged such that hole elements H are interspersed above, below, and to the right and to the left of dot elements D, much as in a checkerboard.

Thus, there are twice as many elements 150 in the mapping array 148 as there are screened dots 135 in a repeat array 130, and the total number of elements 150 in a mapping array 148 is K. However, the total number of device cells 133 specified by the mapping array 148 is S, which is the same as that specified by a repeat array 130.

The entire mapping array 148 is always oriented at 45° with respect to the coordinates of the repeat array 130. The mapping array 148 is positioned so that the portion of the mapping array 148 which maps to the repeat cell 130 contains only complete dot element D. It is also evident from FIG. 7 that a given mapping array 148 overlays various portions of several repeat arrays 130; however, each section of a complete mapping array 148 ca be mapped to a corresponding portion of one of the repeat arrays 130 such that a complete repeat array 130 is covered by the mapping array 148.

To accomplish the filling of device cells 133 in an ordered fashion as the gray level increases, each of the S device cells 133 within the mapping array 148 is preferably assigned to one of three cluster classes, including a core cluster 160, a corner cluster 162, and a main cluster 164.

Figure 8:
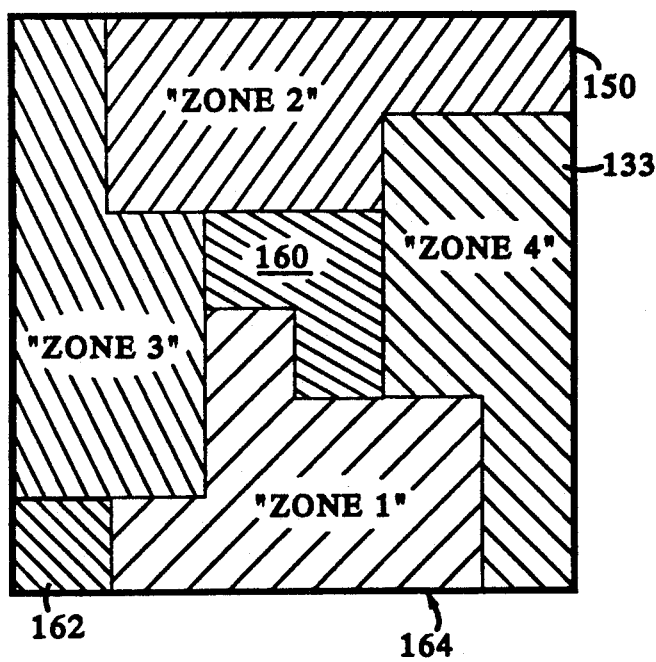
FIG. 8 illustrates the preferred subdivisions of device cells into clusters within a mapping array.

FIG. 8 shows an exemplary element 150 and the orientation of the various clusters within. In the example shown, the element 150 is a 6×6 array of device pixels 133. The core cluster 160 associated with exemplary element 150 contains a fixed number, C, of device cells 133. In the examples shown, C is 3. The device cells 133 mapped to a core cluster 160 are those being closest to the center point of a corresponding dot or hole of each element 150. Thus, if there are K elements 150 in a given mapping array 148, and there are C device cells 133 mapped to each core cluster 160, then the total number of core cluster device cells 133 is $C \times K$. The total number of core cluster device cells 133 mapped by dot elements D is thus CK/2; and a like number are mapped by the hole elements H.

The remaining S - CK device cells 133 are either assigned to main clusters 164 or corner clusters 162. Each main cluster 164 is preferably divided into four zones of equal size. If N is the total number of device cells 133 in zones of a particular type then the total number of main cluster 164 device cells 133 is 4N. The 4N device cells are assigned to specific zones by a process of successive subdivision, to each of the K elements 150, such that each element 150 contains a main cluster 164 having 4N/K device cells 133. In the example shown, 4N/K=32.

Figure 9:
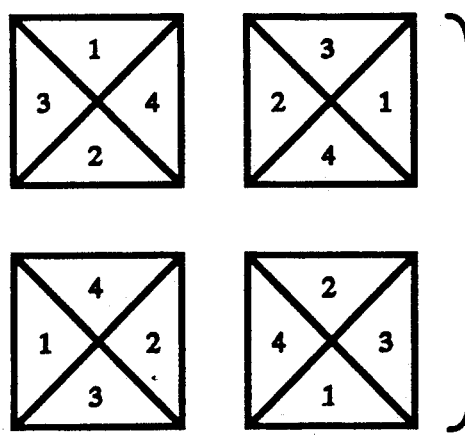
FIG. 9 illustrates four preferred orientations of main cluster zones within a mapping array.

The four zones within each main cluster 164, indicated as "zone 1" through "zone 4" in FIG. 8, are oriented in one of four ways as shown in FIG. 9. The result is that the orientation of the main clusters 164 alternates from element 150 to element 150, thereby providing effectively four different types of main clusters 164. Alternation in the orientation of the main clusters 164 serves as the vehicle for insuring that the screened dots 135 appear well balanced about the centerlines, as described in connection with FIG. 5.

Returning to FIG. 8, the remaining L device cells 133, are assigned to the corner clusters 162. In the FIG. 8 example, L=1.

To determine how many device cells 133 are assigned to each cluster type, the smallest possible value for L and largest possible value for N are determined so that the following relationships are true:

$$L \geq K;$$

and $$L = S - C + 4N$$

That is, L and N are chosen so that there is at least one device cell 133 in the corner cluster 162 of each element 150. The L/K device cells 133 assigned to each corner cluster 162 are determined by locating the device cells 133 at the greatest possible radial distance from the center of the corresponding element 150. This results in corner clusters 162 in which at least one device cell 133 is always actually positioned in a corner of its corresponding element 150.

Once the configuration of the various zones in the mapping array 148 has been determined, a repeat array 130 for each gray level is built. The first repeat array 130 is the one specified by a mapping array 148 in which all of the device cells 133 are set to a white value. A fixed number of device cells, G, are then filled (i.e. their value is changed to black) according to a sequence as described below. The value of G depends upon the total number of device cells, S, within the mapping array 148 and the total number of possible gray levels, Q, such that $$G = S/Q.$$

The values in the mapping array 148 are then stored in the half tone screen pattern file, to provide a repeat array 130 for the second gray level. The process then continues until repeat arrays for all Q gray levels are determined.

It is readily apparent that the invention makes possible a much finer gradation in gray level than other techniques. Although the maximum number of gray levels possible is actually equal to S, we have found an optimum compromise is to have Q=4S/K, so that G=K/4. This still results in an increase in the number of available gray levels when compared to conventional techniques, which add a minimum of one device cell 133 per screened dot 135 per gray level step.

In the preferred embodiment the incremental number, G, of device cells 133 added per gray level is sufficient only to fill a device cell 133 in half of the elements 150 in the mapping array 148. In the preferred case, assuming that K/2 is even, the clusters of each type are thus effectively divided into two groups of equal size, namely "even" and "odd" groups, with each group containing K/4 device cells 133. Otherwise, if K/2 is odd, the two groups will have G1 and G2 device cells 133, respectively, where G1=integer(K/4) and G2=G1+1.

The preferred sequence for filling each set of G device cells 133 is to first fill all device cells 133 of a given cluster type. The cluster types are each filled in the following order:
all dot core clusters
all dot main clusters
all dot corner clusters
all hole corner clusters
all hole main clusters
all hole core clusters The rules used to determine the order in which device cells 133 are filled within each of the cluster types determine the shapes of the resulting screened dots 135. Several sets of rules are possible; the set of rules in the preferred embodiment produces screened dots 132 which are essentially round at the light and dark tones, and progress to an approximately an elliptical shape in the mid tones.

For example, one rule is that the device cells 133 in a core cluster 160 are filled in order of increasing radial distance from the center point of the associated screened dot 135. We have found that filling the core clusters 160 separately in this manner ensures more solid, well-formed screened dot cores, which in turn ensures that the screened dots 135 appear to "grow" in a well-formed manner as the gray level is increased. In addition, the filling of core clusters 160 in this manner balances the screened dots 135 about the dot centerlines, even at the smallest gray levels.

Another rule is that the device cells 133 in the main clusters 164 are filled in each of zones 1-4 in turn. Thus, in the preferred embodiment, device cells 133 are first filled in zone 1 until all main clusters 164 in the mapping array 148 have had one device cell 133 filled, and then the device cells 133 in zone 2 are filled, and so forth.

Within each zone, device cells 133 are added in order of increasing radial distance from the center of the associated screened dot 132. Device cells are also filled in alternating even and odd groups.

Device cells 133 in both dot and hole corner clusters 162 are filled in the same order in which they are selected, that is, in order of decreasing radial distance from the center points of the associated elements 150. This scheme provides the principal advantage of elliptical-shaped screened dots 132, which is to ensure a smooth transition through the mid tones. It additionally provides a mechanism for handling the extra device cells 133 that result when S/K is not an integer.

The hole main clusters 164 and hole core clusters 160 are filled in exact reverse order of their respective dot cluster counterparts, thereby achieving the same advantages for holes as for dots.

Figure 10:
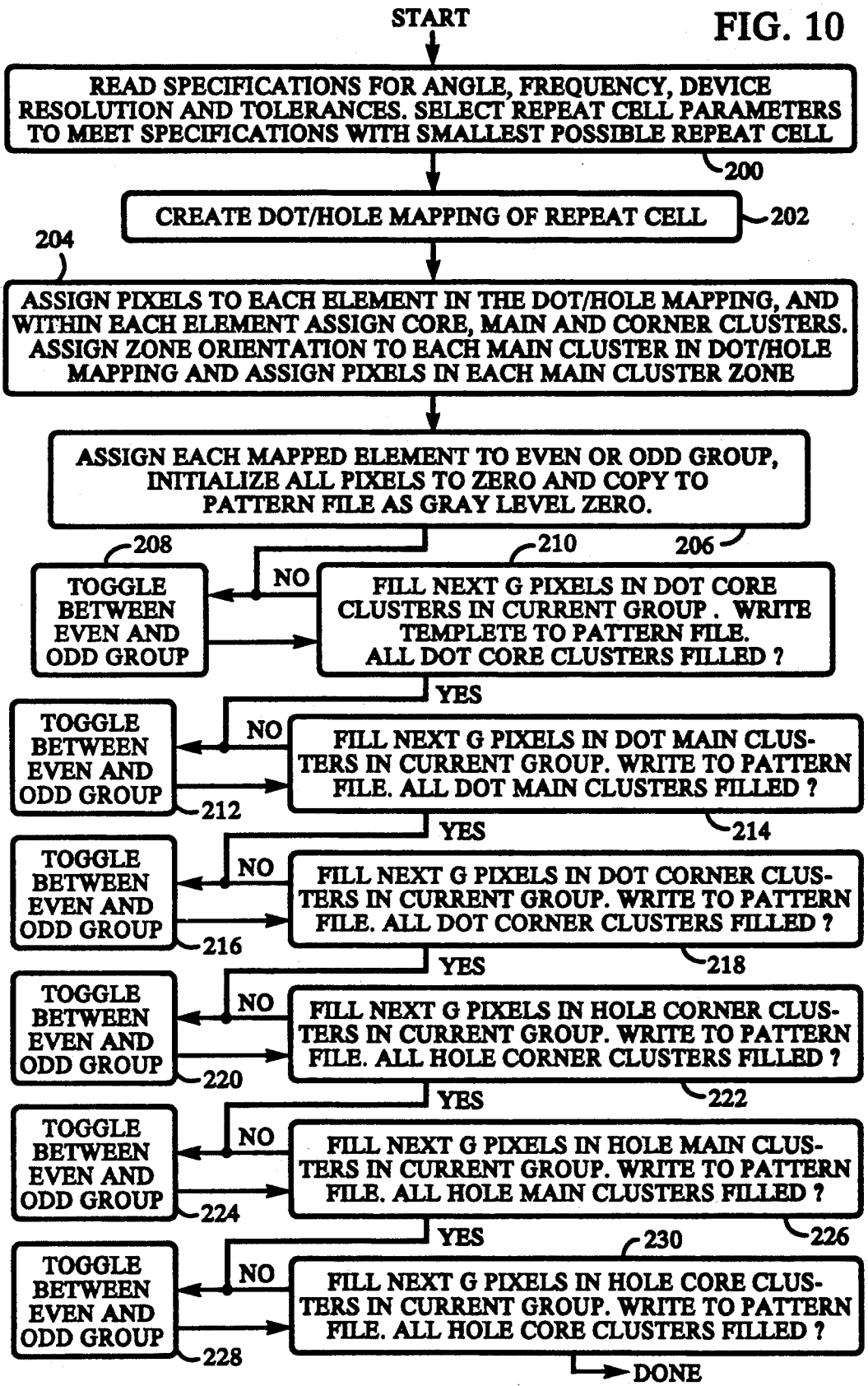
FIG. 10 is a flow chart of the steps performed by the screen generator module to produce a half tone screen pattern file in accordance with the invention.

A flow chart of the steps performed by the screen generator module 125 to accomplish the above-described creation of repeat arrays 130 is shown in FIG. 10. The first step 200 is to read the screen parameters and generate a mapping array 148 having the proper dimensions as specified by an input screen angle, frequency, and desired accuracy. Next, in step 202, the mapping array 148 is filed with all white device cells 133. In step 204, the core, main, and corner clusters are assigned, and in step 206, each mapped element 150 is assigned to an even or odd group.

A repeat array 130 for each gray level is then determined in steps 208 through 230. Starting with an even-numbered group, for example, in step 208, control passes to step 210 where the first G pixels in the dot core clusters 160 of the mapping array 148 are filled. The resulting array values are then stored in the screen pattern file as a repeat array 130 for first gray level. Steps 208 and 210 are then iteratively executed until all CK/2 device cells 133 in the dot core clusters 160 ar filled.

Similarly steps 212 and 214 are executed until all dot main clusters 164 are filled, and then all dot corner clusters 162 are filled, and so forth through steps 216 through 230, until all hole corner clusters 162, hole main clusters 164, and hole core clusters 160 are also filled.

(3) COMPACT REPRESENTATION OF HALF TONE SCREEN PATTERNS

When assembling the pattern file from the Q repeat arrays 130 generated by the aforementioned process, it is desirable to create the smallest pattern file possible, so that space in the storage device 104 or memory 103 is conserved. To appreciate how this can be accomplished, it is helpful to consider how a repeat array 130 is constructed from the mapping array 148 for a given gray level.

Each device cell 133 is originally represented as a single binary bit in an array of S device cells, as previously mentioned. Consider an example where the repeat array 130 contains 4096 device cells 133. With one bit needed to specify each device cell, the device cells would typically be grouped into 32 bit device-cell words, with 128 of such words required to describe the repeat array 130 for a particular gray level. If Q is 256, the half tone screen pattern file contains 256 repeat arrays 130, and thus the total number of memory locations required is 256×128 32-bit words, or 131,072 bytes.

However, the preferred embodiment of the invention takes advantage of the fact that the patterns of screened dots 132 generally grow in a monotonic fashion with increasing gray level, and thus each device cell 133 only transitions from white to black once, at a particular gray level. It is therefore possible to construct a table for each word, listing the gray levels at which the transitions for each bit occur. It can readily be seen that such a set of tables is a complete description of the Q repeat arrays 130.

Figure 11:
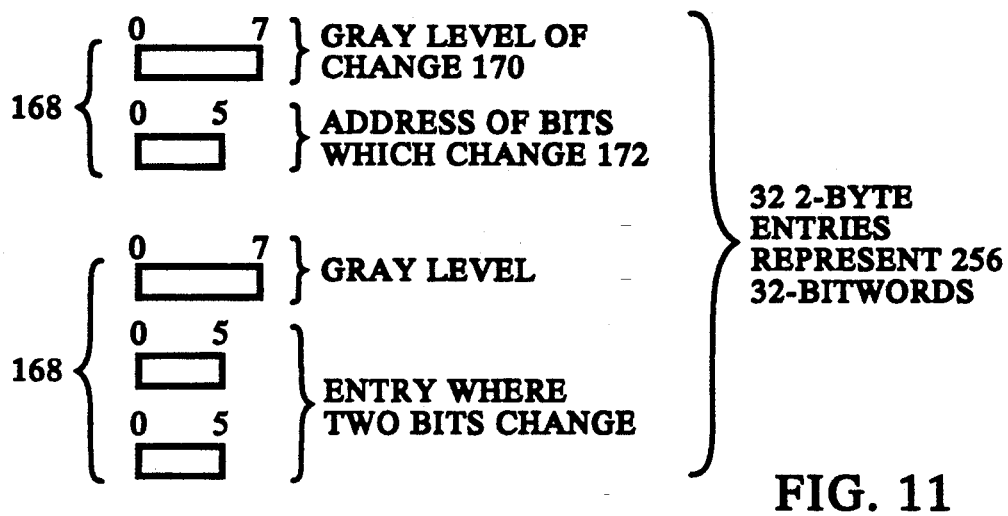
FIG. 11 illustrates a technique for creating a compacted half tone screen pattern file.

In the preferred embodiment this set of tables includes a number of entries 168. As shown in FIG. 11, the first byte 170 in each entry 168 specifying the next gray level at which one or more bits in a particular 32-bit word changes. The second byte 171 in each entry 168 is a five-bit address specifying exactly which bit changes at the specified gray level. Most entries 168 will be only two bytes long; however, some entries may be three or more bytes long, if more than one bit changes at a particular gray level. In the typical case, the size of such a table based-file would be at most 128×32 ×2, or 8,192 bytes.

Although this method substantially reduces the amount of data stored, recreating a word in the repeat array 130 for a given gray level requires processing every entry in the table prior to it, that is, every lower gray level. If this processing overhead is unacceptable in a particular application, it can be reduced by also storing a complete description of a limited number of repeat arrays 130 at predetermined gray levels. While this slightly increases the required amount of data, a maximum number of table entries to be processed can be guaranteed. In the preferred embodiment of the invention, complete repeat arrays 130 are stored for every eighth gray level.

4) HALF TONE SCREEN PATTERN APPLICATION

As previously mentioned in connection with FIG. 2, the invention also includes a screen applicator 129 which applies the Q repeat arrays 130 in the half tone screen pattern file to determine a half tone rendering of the image at a specified output resolution.

Figure 12:
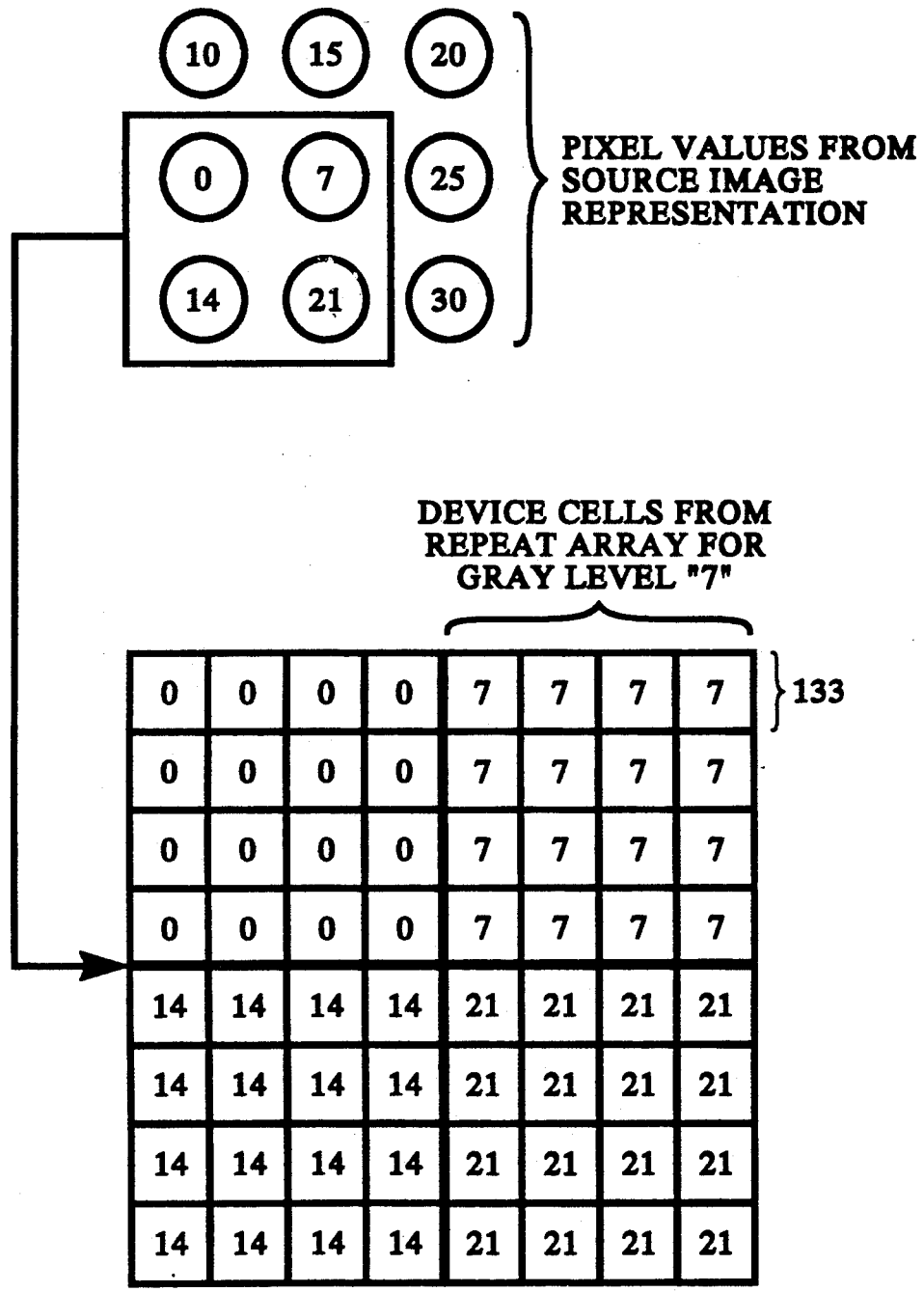
FIG. 12 illustrates a technique for uninterpolated mapping of source image pixel values to device cells.

With one rendering technique, such as that illustrated in FIG. 12, each source image pixel value 250 is rendered by finding the corresponding array of device cells 133 within the repeat array 130. The result is a rendering in which the screened dots 135 (not shown in FIG. 12) are formed using the available resolution of the output device 115. However, the gray level resolution of the output image is still limited by the spatial resolution of the input device 111. For example, in the case illustrated in FIG. 12, each pixel value always maps exactly to a 4×4 array of device cells 133 from a given repeat array 130; and thus the screened dots so formed are formed only at the resolution of the input device.

Figure 13:
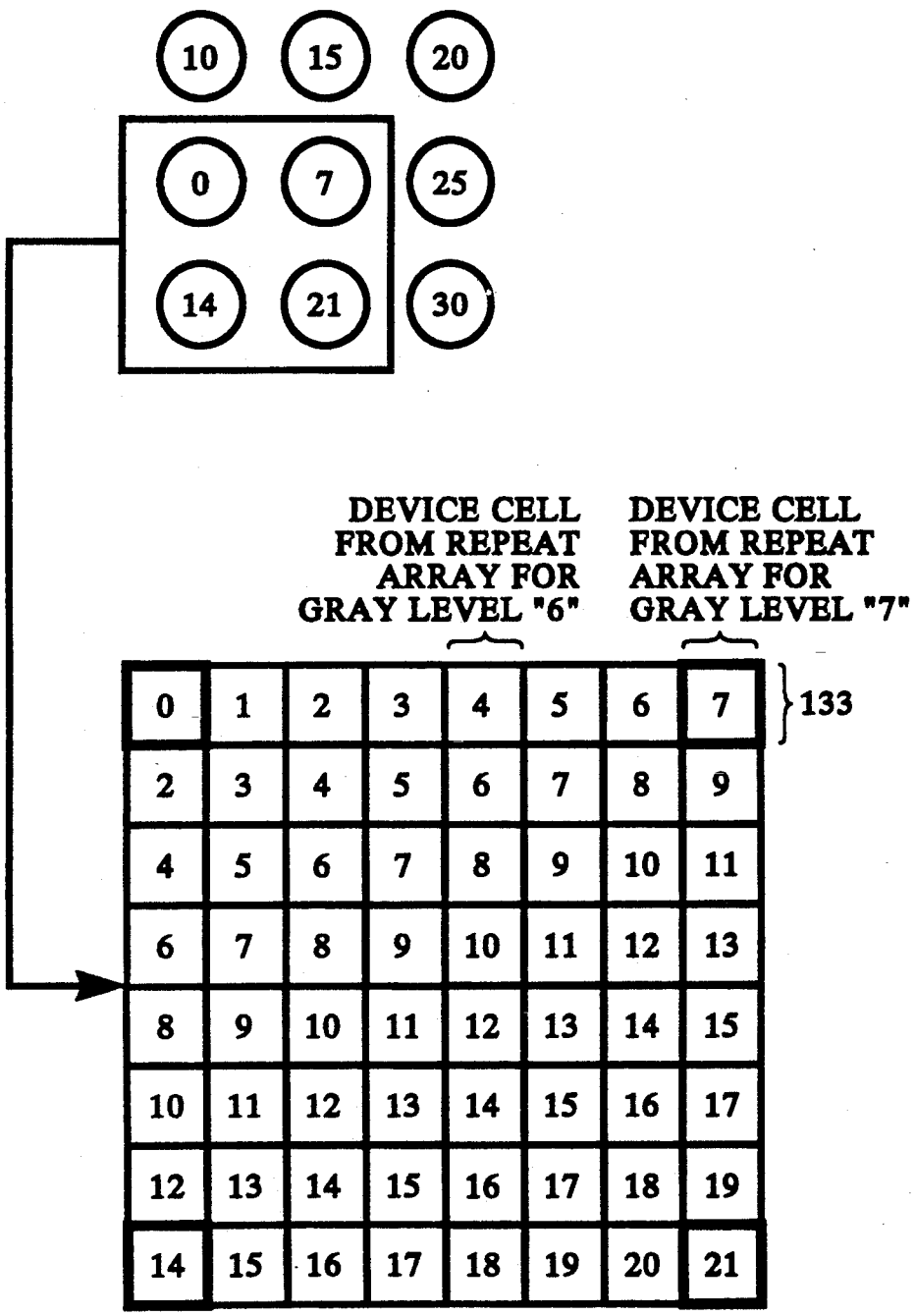
FIG. 13 illustrates a preferred interpolated mapping of source image pixel to device cells.

A preferred alternative makes better use of the resolution of the output device 115. With this approach, as shown in FIG. 13, the pixel values are considered to be a matrix of point samples in a continuous coordinate space. The coordinates of these point samples are then mapped to the coordinates of the output device 115. The sample points are then linearly interpolated at the pitch of the output device 115 to determine a gray level value for each device cell 133. To render each device cell 133, the repeat array 130 associated with every interpolated pixel value is examined, to find the value of the corresponding device cell 133 contained therein. Thus, a much finer gradation in the resulting screened dot 135 is achieved.

Figure 14C:
FIGS. 14(a–c) further illustrates the preferred method of mapping source image pixel values pixels to device cells.
Figure 14A:
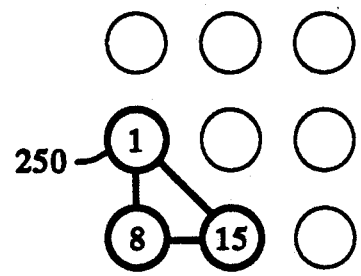
Figure 14B:
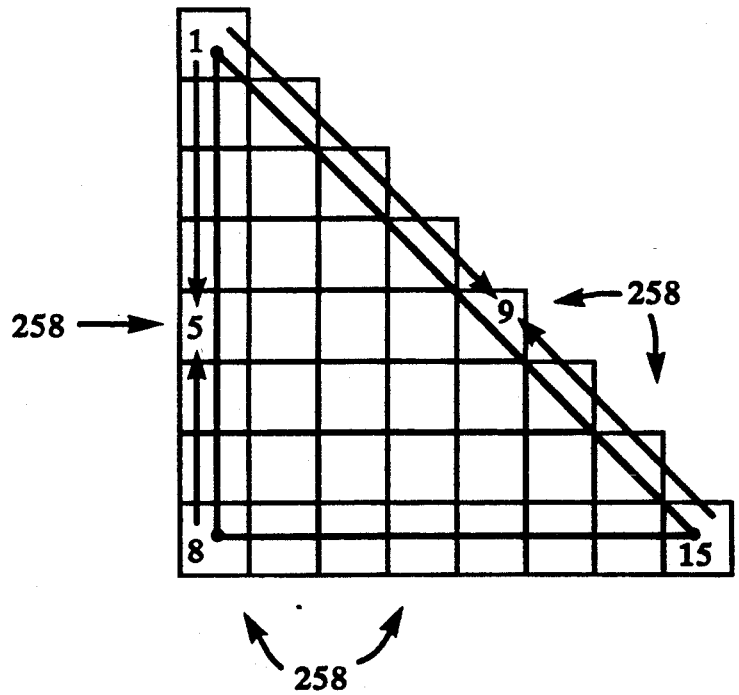

For a better understanding of how the interpolation is preferably and efficiently accomplished, refer to FIG. 14A. The source image pixel values are first arranged into small groups to form the vertices of a set of closed polygons. The preferred group size is three, so that the closed polygons are triangles 256. Each such triangle 256 thus defines a planar surface in continuous space which is mapped into the coordinate system of the output device 115. The interpolated pixel values 258 along the sides of each triangle are then determined using a Brezenham algorithm, or similar known technique for determining which pixels lie along the sides of a closed polygon, as shown in FIG. 14B.

As shown in FIG. 14C, interpolated gray values 258 for the remaining device cells 133 within each horizontal row of the current triangle are determined by linearly interpolating the pixel values 258 previously found for the sides of the triangle.

Next, and incremental change in gray level across the current row is then determined. If the incremental change indicates that there are no gray level transitions within a row, the device dots associated with the current row are rendered according to the corresponding values in the printer cells 1333 of the repeat array 130 associated with the current gray level.

If there are one or more gray level transitions within a current row, it is processed in two or more sections, with each section consisting of all of the device cells 133 which are to be rendered at a particular gray level.

An additional measure of efficiency is obtained when this process is performed in conjunction with the table based, compacted pattern file described previously in connection with FIG. 11. In particular, if the 32-bit words in the repeat arrays 130 for a sequence of gray levels are examined, it is readily apparent that in the vast majority of cases only a few device cells 133 are changed through several gray levels for a given 32-bit word. Thus, the rendering process can easily determine, for a given 32-bit word, how many gray level transitions must occur before any bit in that word is actually affected. If the gray level transitions within a current row of interpolated pixels 258 are such that no bit within a group is affected, then the entire row is treated as a single gray level.

Figure 15:
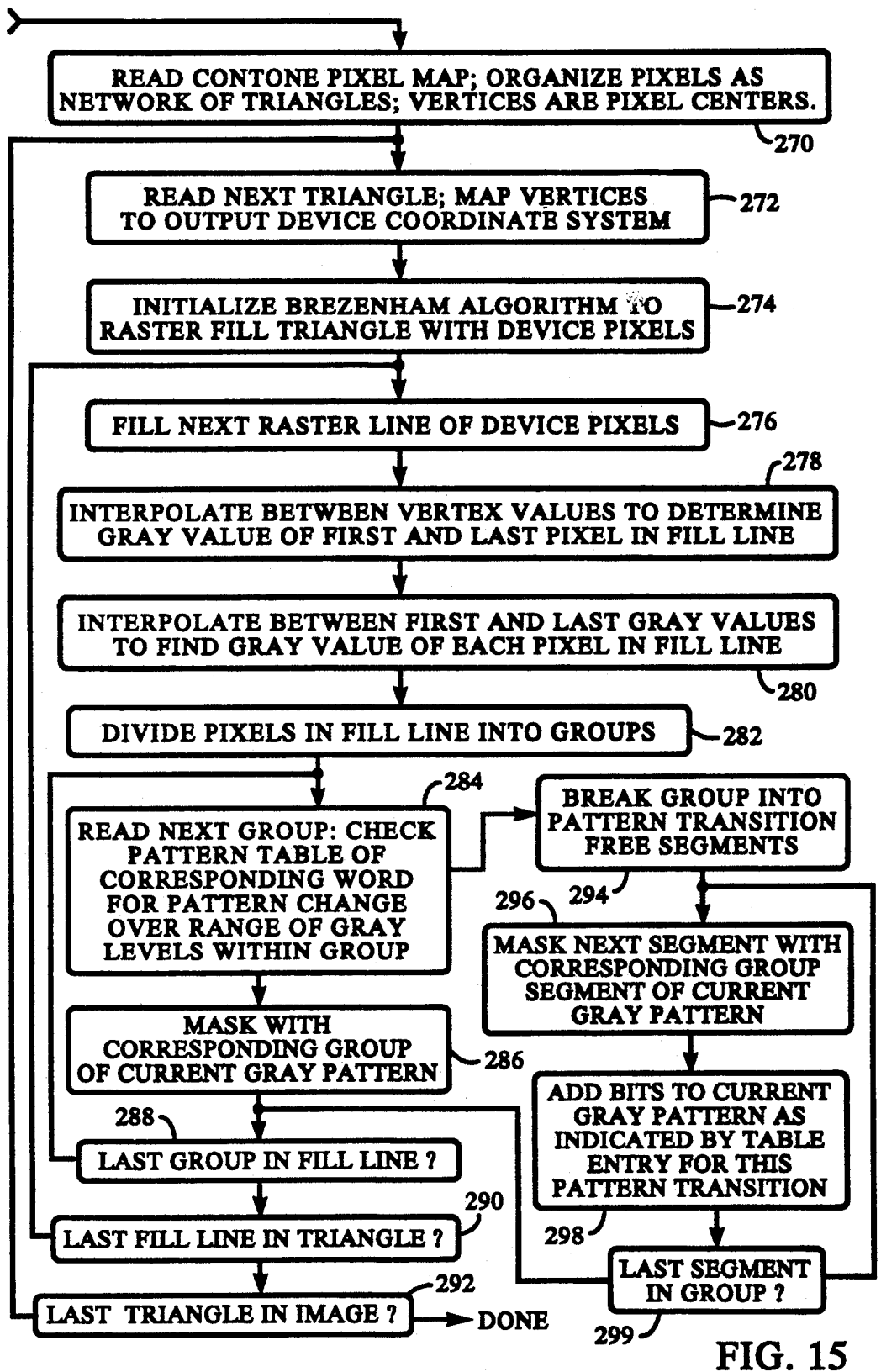
FIG. 15 is a flow chart of the steps performed by the screen applicator module to obtain an output image rendering from the half tone screen pattern file and the contone image representation.

FIG. 15 is a flow chart of the operations performed by the preferred embodiment of the screen applicator module 129. An initial step 270 is to read a section of the source image representation and determine pixel values for a set of triangle vertices. Step 272 then translates the vertices to the output device coordinate system. Step 274 uses a Brezenham algorithm to determine which device cells 133 in a current output raster line or row are within the triangle.

Steps 276, 278, and 280 next determine linearly-interpolated pixel values for each device cell 133. First, the triangle vertex values are used to determine the interpolated pixel values for the sides of the triangle. The side values, or first and last interpolated values, are then further linearly interpolated to determine interpolated pixel values for each device cell to be rendered in the current row.

After the triangle interpolation process, in step 282, the interpolated pixel values 258 are then arranged into groups of 32, that is, into groups of the same size as the elemental word size in the half tone screen pattern file.

Step 284 then checks each group of interpolated pixel values to determine if a sufficient change in value occurs to warrant the need for using more than one repeat array 130 in the screen pattern file to render the current row.

If not, step 286 is next executed to render the device cells 133 associated with the current row as specified by the corresponding word or words in the repeat array 130 associated with the single current gray level.

However, if there is a sufficient change in gray level, step 295 breaks the current row into segments of adjacent pixels having the same gray value. Then, in steps 296 and 298, a current segment is rendered by finding the corresponding segment of a word from the pattern file. Step 299 causes steps 296 and 298 to be executed for each segment.

Finally, steps 288, 290, and 292 cause the aforementioned steps to be executed for every 32-bit word in the fill lines every fill line in the current triangle, and every triangle in the image, respectively.

It has thus been shown how a screen pattern file constructed in accordance with the invention can be used to render a screened image without repeated trigonometric or other intensive mathematical operations.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A computer-based system for synthesizing a screened image representation, the screened image representation consisting of an array of screen cells, and with a source image being specified as an array of pixel values specifying at which gray level a corresponding elemental area of the image is to be rendered on an output device, the system comprising:

means for providing screen parameters, the screen parameters specifying the angle and interval of half tone screened dots in a half tone screen representation;

means for generating a half tone screen representation, the half tone screen representation consisting of repeat arrays, with a repeat array for each possible gray level in the screened image representation, and with each repeat array consisting of an array of screen cell values, with each screen cell including an array of device cells, with each device cell specifying how an elemental device dot is to be rendered, the repeat array specifying the representation of two or more complete adjacent half tone screened dots for the corresponding gray level, and the repeat array also specifying the representation of two or more complete half tone screen holes for the corresponding gray level.

2. A system as in claim 1 wherein the means for generating a half tone screen representation further specifies the formation of an archetypical half tone dot element for a given half tone screen, through all of the gray levels for which the half tone screen is defined, and wherein the means for generating a half tone screen representation further comprises:

means for dividing the device cells into words of a fixed bit length;

means for determining, for each word, a sequential list of gray levels at which any bit in the word changes value; and means for storing a table for each word, the table consisting of the list of gray level transition points, and for each such gray level entry in the list, a corresponding bit address indicating which bit in the word changes.

3. A system as in 2 wherein the means for storing additionally stores the complete set of device cells for some predetermined number of gray levels at intervals through the gray levels for which the half tone dot element is defined.

4. A system as in claim 1 wherein the means for generating a half tone screen representation includes screen cell values grouped into clusters.

5. A system as in claim 4 wherein one such cluster describes a core area of the screen cells.

6. A system as in claim 4 wherein one such cluster describes a main area of the screen cells.

7. A system as in claim 6 wherein one such main area cluster is divided into four zones.

8. A system as in claim 4 wherein one such cluster described a corner area of the screen cells.

9. A system as in claim 4 wherein one such cluster describes a core area of the screen holes.

10. A system as in claim 4 wherein one such cluster describes a main area of the screen holes.

11. A system as in claim 4 wherein one such screen hole main cluster is divided into four zones.

12. A system as in claim 4 wherein one such cluster describes a corner area of the screen holes.

13. A system as in claim 4 having a plurality of clusters, wherein a cluster describes each one of a core area, a main area, and a corner area of the screen cells, and a core area, a main area, and a corner area of the holes, and the means for generating a half tone screen representation generates arrays of screen cell values for successive gray values by setting the screen cell values, in turn, of the dot core, dot main, dot corner, hole corner, hole main, and hole core clusters.

14. A system for rendering an output half tone image on an output device from a source image comprised of input device resolution continuous tone pixel values, the system comprising:

means for mapping the source images pixel values to form a matrix of point samples in continuous coordinate system;

means for providing a half tone screen representation, the half tone screen representation consisting of repeat arrays, with a repeat array for each possible gray level in the output image, and with each repeat array consisting of an array of device cell values, with each device cell value associated with a device dot of the output device, the array of device cell values specifying a representation of two or more complete half tone screened dots for the corresponding gray level;

means for interpolating between point samples, at the output resolution, to determine a gray level; and means for rendering each pixel value by examining the repeat array for that gray level at the corresponding input pixel position.

15. A system as in claim 14 wherein the point samples in the continuous coordinate system are each considered to constitute a vertex of two or more adjacent polygons in the continuous coordinate system, each such polygon being described by the set of sample points which comprise its vertices and each such polygon having all of the graphical properties associated with the general class of polygons described in a continuous coordinate system.

16. A system as in claim 15 wherein the polygons are triangles.

17. A system as in claim 15 wherein each polygon is mapped to the output device coordinate system by means of a transformation matrix applied to its vertices.

18. A system as in claim 17 wherein each transformed polygon is raster filled using a polygon raster fill algorithm, and wherein:

a unique gray level is associated with each bit of fill data, which gray level is determined by interpolation from vertex values; and each bit of fill data is then rendered as an image of the corresponding bit in the half tone repeat array representing the gray level associated with that fill bit.

19. A system as in claim 18 wherein the means for interpolating comprises:

means for determining a gray value for a starting and ending pixel of each row to be filled via linear interpolation; and means for calculating an incremental change in gray level per incremental distance;

means for determining, within words and/or partial words in the row, where transitions in gray level occur, and in those words or partial words, at which bit position(s) the transitions occur; and means for segmenting those words wherein transitions occur into sections of uniform gray level so that each word, partial word and word segment are each of uniform gray level and may be rendered as an image of the corresponding word or word segment in the half tone repeat array representing that gray level.

20. A system as in claim 19 wherein the means for rendering additionally comprises:

means for dividing the device cell values into groups of a fixed word length;

means for determining, for each word, a sequential list of gray levels at which any bit in the word changes its value; and means for storing a table for each word consisting of the list of gray level transition points and, for each such entry in the list, for storing an indication of which bits in the word change.

21. A system as in claim 20 wherein the means for rendering additionally checks each gray level transition in a given word of fill data against the table for the corresponding word of pattern data in order to determine whether the gray level transition in question causes any change in the repeat array for that word, thereby avoiding the processing overhead of segmenting the word in those cases wherein the repeat array does not change for that word as a consequence of the change in gray level.

22. A system for half tone reproduction of a source image, having a continuous tone content, on an output device, the system comprising:

A. means for scanning the image, and providing an array of pixel values corresponding to the continuous tone content of the image, with the magnitude of a pixel value corresponding to the value in a corresponding pixel in the source image;

B. means for providing screen parameters, the screen parameters specifying an angle and interval, at which half tone screened dots occur in a half tone screen representation;

C. means for generating a half tone screen representation, the half tone screen representation consisting of repeat arrays, with a repeat array for each possible gray level in the screened image representation, and with each repeat array consisting of an array of screen cell values, with each screen cell including an array of device cells, with each device cell specifying how an elemental device dot is to be rendered, the repeat array specifying the representation of two or more complete adjacent half tone screened dots for the corresponding gray level, and the repeat array also specifying the representation of two or more complete half tone screen holes for the corresponding gray level; and D. screen applicator means, for accepting the array of pixel values and the screen repeat array, and for interpolating corresponding pixel values and density values to produce an array of output device cell values which represent intensity at which corresponding device dots are to be rendered.

23. A system as in claim 22 wherein the screen generator means additionally comprises:

means for varying the dimensions of the screen repeat array in accordance with the specified screen angle and frequency.

24. A computer-based system for synthesizing a screened representation of a source contone image, the source contone image consisting of an array of pixel values, and the screened image representation consisting of an array of device dots, that occur at a given angle, the system comprising:

means for providing screen parameters, the screen parameters specifying the angle and interval of half tone screened dots in the screened image representation; and means for generating a half tone screen representation, the half tone screen representation consisting of a repeat array, with a repeat array for each possible pixel value in the source image, and with each repeat array consisting of an array of screen cells, and each of the repeat arrays specifying the representation of two or more adjacent half tone screened dots for the corresponding pixel value, and the array of screen cells also forming an array of device cells, with each device cell associated with a device dot in the screen image representation;

wherein the half tone screen representation has a corresponding screened dot coordinate system, defined by vertical and horizontal axis thereof, and the output device has an output device coordinate system defined by vertical and horizontal axis thereof, and the relative angle, $\theta$, of the half tone screen representation with respect to the device coordinate system is equal to $\alpha - \beta$, where $\alpha$ equals $\tan^{-1}(b/a)$, with b being the length of the projection of the side of the repeat array on the vertical axis of the device coordinate system, and a being its projection on the horizontal axis of the device coordinate system, and $\beta$ equals $\tan^{-1}(B/C)$, with B being the length of the projection of the side of the repeat array on the vertical axis of the screened dot coordinate system, and A being its projection on the horizontal axis of the screened dot coordinate system.

25. A computer-based system for synthesizing a screened representation of a source contone image, the source contone image consisting of an array of pixel values, and the screened image representation consisting of an array of device dots that occur at an angle and interval thereof, the system comprising:

means for providing screen parameters, the screen parameters specifying the angle and interval of half tone screened dots in the screened image representation; and means for generating a half tone screen representation, the half tone screen representation consisting of a repeat array, with a repeat array for each possible pixel value in the source image, and with each repeat array consisting of an array of screen cells, and each of the repeat arrays specifying the representation of two or more adjacent half tone screened dots for the corresponding pixel value, and the array of screen cells also forming an array of device cells, with each device cell associated with a device dot in the screen image representation;

wherein the half tone screen representation has a corresponding screened dot coordinate system defined by vertical and horizontal axis thereof, and the output device has an output device coordinate system defined by vertical and horizontal axis thereof, and the dot frequency of the half tone screen representation relative to a screened dot coordinate system is equal to $$\sqrt{(A^2 + B^2)} \cdot Rd/\sqrt{(a^2 + b^2)} \,;$$

with Rd being the pitch of the output device;
  B being the length of the projection of a side of the repeat array on the vertical axis of the screened dot coordinate system, and A being its projection on the horizontal axis of the screened dot coordinate system; and
  b being the length of the projection of the side of the repeat array on the vertical axis of the device coordinate system, and a being its projection on the horizontal axis of the device coordinate system.

26. A system as in claim 1 wherein the half tone screen representation has a corresponding screened dot coordinate system defined by horizontal and vertical axis thereof, and the output device has an output device coordinate system, and the relative angle, $\theta$, of the half tone screen representation with respect to a device coordinate system associated with is equal to $\alpha - \beta$, where
  $\alpha$ equals $\tan^{-1}$ (b/a), with b being the length of the projection of a side of the repeat array and the vertical axis of the device coordinate system, and a being its projection on the horizontal axis of the device coordinate system, and
  $\beta$ equals $\tan^{-1}$ (B/C), with B being the length of the projection of a side of the repeat array on the vertical axis of the screened dot coordinate system, and A being its projection on the horizontal axis of the screened dot coordinate system.

27. A system as in claim 1 wherein the half tone screen representation has a corresponding screened dot coordinate system, and the output device has an output device coordinate system, and the dot frequency of the half tone screen representation relative to a screened dot coordinate system is equal to $$\sqrt{(A^2 + B^2)} \cdot Rd/\sqrt{(a^2 + b^2)} \,;$$

with Rd being the pitch of the output device;
  B being the length of the projection of the side of the repeat array on the vertical axis of the screened dot coordinate system, and A being its projection on the horizontal axis of the screened dot coordinate system; and
  b being the length of the projection of the side of the repeat array on the vertical axis of the device coordinate system, and a being its projection on the horizontal axis of the device coordinate system.

* * * * *